(12) United States Patent
Chan

(10) Patent No.: US 8,876,125 B1
(45) Date of Patent: Nov. 4, 2014

(54) FRAME APPARATUS FOR LIGHTWEIGHT ROLLATOR

(71) Applicant: Shu-Chen Chan, Changhua Hsien (TW)

(72) Inventor: Shu-Chen Chan, Changhua Hsien (TW)

( * ) Notice: Subject to any disclaimer, the term of this patent is extended or adjusted under 35 U.S.C. 154(b) by 47 days.

(21) Appl. No.: 13/861,972

(22) Filed: Apr. 12, 2013

(51) Int. Cl.
| | |
|---|---|
| B62D 61/10 | (2006.01) |
| B62K 5/007 | (2013.01) |
| B62K 15/00 | (2006.01) |

(52) U.S. Cl.
CPC .......... *B62L 15/00* (2013.01); *B62K 2015/001* (2013.01); *B62K 5/007* (2013.01)
USPC .......................................................... 280/22

(58) Field of Classification Search
USPC .............. 180/22, 208, 215, 216, 311; 280/30, 280/278, 638, 643, 648
See application file for complete search history.

(56) References Cited

U.S. PATENT DOCUMENTS

| | | | | |
|---|---|---|---|---|
| 5,941,327 | A * | 8/1999 | Wu | 180/65.1 |
| 6,170,592 | B1 * | 1/2001 | Wu | 180/65.1 |
| 6,336,517 | B1 * | 1/2002 | Cheng | 180/208 |
| 6,655,717 | B1 * | 12/2003 | Wang | 280/781 |
| 7,044,249 | B2 * | 5/2006 | Fan | 180/208 |
| 7,059,441 | B2 * | 6/2006 | Chen | 180/208 |
| 7,234,557 | B2 * | 6/2007 | Chen | 180/208 |
| 7,252,168 | B2 * | 8/2007 | Lin et al. | 180/208 |
| 7,401,675 | B2 * | 7/2008 | Chang | 180/208 |
| 2004/0144589 | A1 * | 7/2004 | Chen | 180/311 |
| 2005/0139410 | A1 * | 6/2005 | Fan | 180/311 |
| 2006/0086553 | A1 * | 4/2006 | Chen | 180/208 |
| 2007/0000714 | A1 * | 1/2007 | Lin | 180/311 |
| 2007/0063504 | A1 * | 3/2007 | Hsiao | 280/781 |

* cited by examiner

*Primary Examiner* — Paul N Dickson
*Assistant Examiner* — Robert A Coker
(74) *Attorney, Agent, or Firm* — WPAT, P.C.; Anthony King

(57) ABSTRACT

A frame apparatus for a lightweight rollator has a front frame and a rear frame. The front frame has a base and a handle frame. The base has two connecting tabs, two locking elements and a mounting frame. The handle frame is rotatably connected to the base and has a front wheel and two connecting arms. The connecting arms are formed on and protrude from the handle frame and are pivotally connected to the base between the connecting tabs. The rear frame is connected to the front frame and has a bottom mount, two rear wheels and at least one driving motor. The bottom mount is connected to the mounting frame and has a guiding rod and an engaging shaft. The rear wheels are rotatably connected to the bottom mount. The at least one driving motor is mounted on the bottom mount and is connected to the rear wheels.

20 Claims, 12 Drawing Sheets

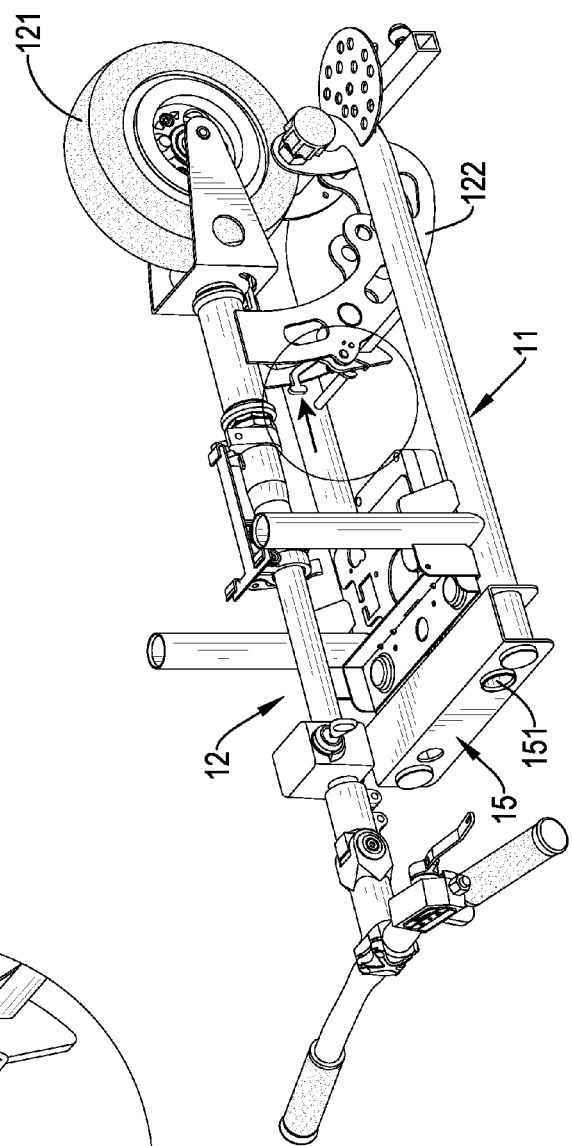
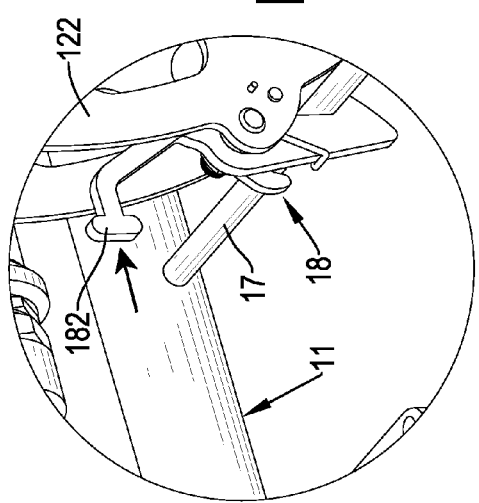

FRAME APPARATUS FOR LIGHTWEIGHT ROLLATOR

BACKGROUND OF THE INVENTION

1. Field of the Invention

The present invention relates to a frame apparatus, and more particularly to a frame apparatus for a lightweight rollator; the frame apparatus can be assembled easily, can be transported conveniently and can be moved freely in a limited indoor space.

2. Description of Related Art

Many elderly people or patients may need mobility aids, and a conventional rollator can be used to provide a transporting effect to the elderly or the patients. The conventional rollator has a frame apparatus, a seat and a power device. The seat is mounted on the frame apparatus. The power device is mounted on the frame apparatus to provide a power to the frame apparatus. Then, the elderly or the patients can move around with the aid of the conventional rollator.

However, the structure of the conventional rollator is bulky, and the conventional rollator cannot be moved freely in a narrow space. Consequently, the elderly or the patients cannot move directly from the bed to the conventional rollator and this is inconvenient in use. In addition, since the structure of the conventional rollator is bulky, a large space is required to store the conventional rollator. Furthermore, the conventional rollator cannot be folded and this is laborious and inconvenient in transportation.

To overcome the shortcomings, the present invention provides a frame apparatus for a lightweight rollator to mitigate or obviate the aforementioned problems.

SUMMARY OF THE INVENTION

The main objective of the present invention is to provide a frame apparatus for a lightweight rollator; the frame apparatus can be assembled easily, can be transported conveniently and can be moved freely in a limited indoor space.

The frame apparatus for a lightweight rollator in accordance with the present invention has a front frame and a rear frame. The front frame has a base and a handle frame. The base has two connecting tabs, two locking elements and a mounting frame. The handle frame is rotatably connected to the base and has a front wheel and two connecting arms. The connecting arms are formed on and protrude from the handle frame and are pivotally connected to the base between the connecting tabs. The rear frame is connected to the front frame and has a bottom mount, two rear wheels and at least one driving motor. The bottom mount is connected to the mounting frame and has a guiding rod and an engaging shaft. The rear wheels are rotatably connected to the bottom mount. The at least one driving motor is mounted on the bottom mount and is connected to the rear wheels.

Other objectives, advantages and novel features of the invention will become more apparent from the following detailed description when taken in conjunction with the accompanying drawings.

BRIEF DESCRIPTION OF THE DRAWINGS

FIG. 11A is an operational perspective view of the front frame of the frame apparatus in FIG. 4A at a folded condition;

FIG. 11B is an enlarged perspective view of the front frame of the frame apparatus in FIG. 11A.

DETAILED DESCRIPTION OF THE PREFERRED EMBODIMENT

Figure 1:
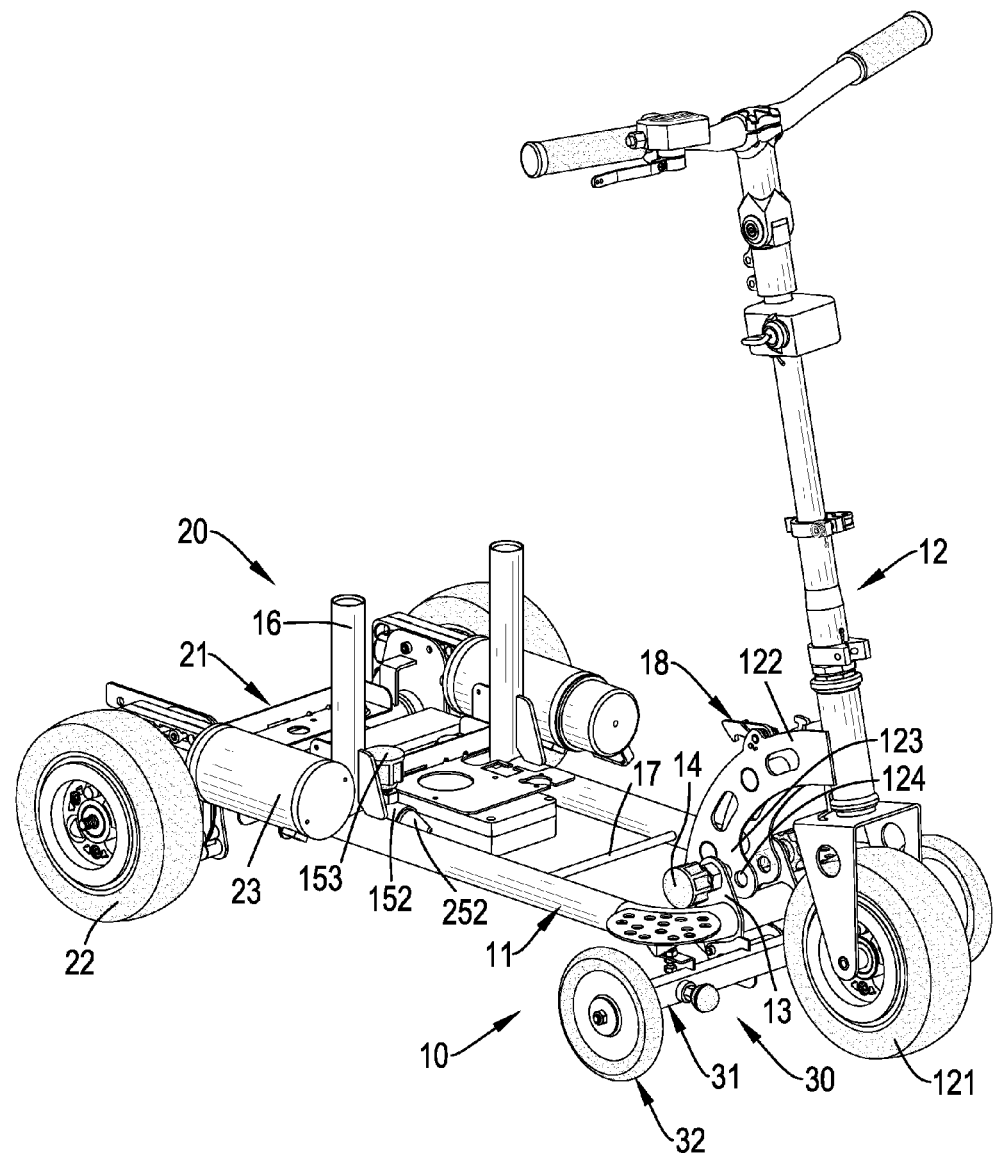
FIG. 1 is a perspective view of a frame apparatus for a lightweight rollator in accordance with the present invention.

With reference to FIGS. 1, 3, 4A and 4B, a frame apparatus for a lightweight rollator in accordance with the present invention has a front frame 10, a rear frame 20 and an auxiliary wheel frame 30.

The front frame 10 has a base 11 and a handle frame 12. With reference to FIGS. 3, 7A, 7B, 11A and 11B, the base 11 is U-shaped and has two free rear ends, a middle, two connecting tabs 13, two locking elements 14, a mounting frame 15, two seat tubes 16 and a positioning shaft 17. The connecting tabs 13 are formed on and protrude upwardly from the middle of the base 11 at an interval and are parallel to each other. The locking elements 14 are retractably and respectively mounted on the connecting tabs 13.

The mounting frame 15 is mounted on the free rear ends of the front frame 10 and has two mounting holes 151, a mounting tube 152 and a holding element 153. The mounting holes 151 are formed through the mounting frame 15 between the free rear ends of the base 11. The mounting tube 152 is mounted in one of the mounting holes 151 and has a front end extending forwardly. The holding element 153 is retractably mounted on the mounting tube 152 near the front end of the mounting tube 152. The seat tubes 16 are respectively formed on and protrude upwardly from the free rear ends of the base 11 and are parallel to each other to hold a seat of the lightweight rollator. The positioning shaft 17 is transversally connected to the base 11 between the middle and the free rear ends of the base 11.

The handle frame 12 is rotatably connected to the base 11 and has a lower end, a front wheel 121 and two connecting arms 122. The front wheel 121 is rotatably connected to the lower end of the handle frame 12. The connecting arms 122 are curved, are formed on and protrude backwardly from the handle frame 12 near the lower end of the handle frame 12 and are pivotally connected to the middle of the base 11 between the connecting tabs 13. Each one of the connecting arms 122 has a locking board 123 formed on and protruding forwardly from the connecting arm 122 to lock with one of the locking elements 14. The locking board 123 of each one of the connecting arms 122 has at least one locking hole 124 formed through the locking board 123. When the locking elements 14 are respectively locked with the locking boards 123 of the connecting arms 122, the handle frame 12 is held securely with the base 11. When the locking elements 14 are respectively separated from the locking boards 123, the connecting arms 122 can be rotated relative to the middle of the base 11, and the handle frame 12 can be moved relative to and folded with the base 11.

Figure 9B:
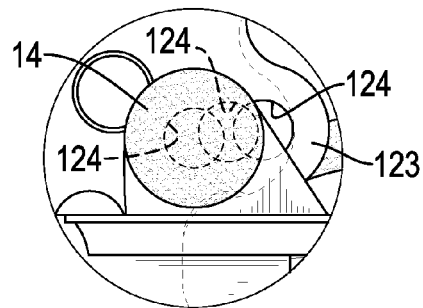
FIG. 9B is an enlarged side view of the front frame of the frame apparatus in FIG. 9A.
Figure 9A:
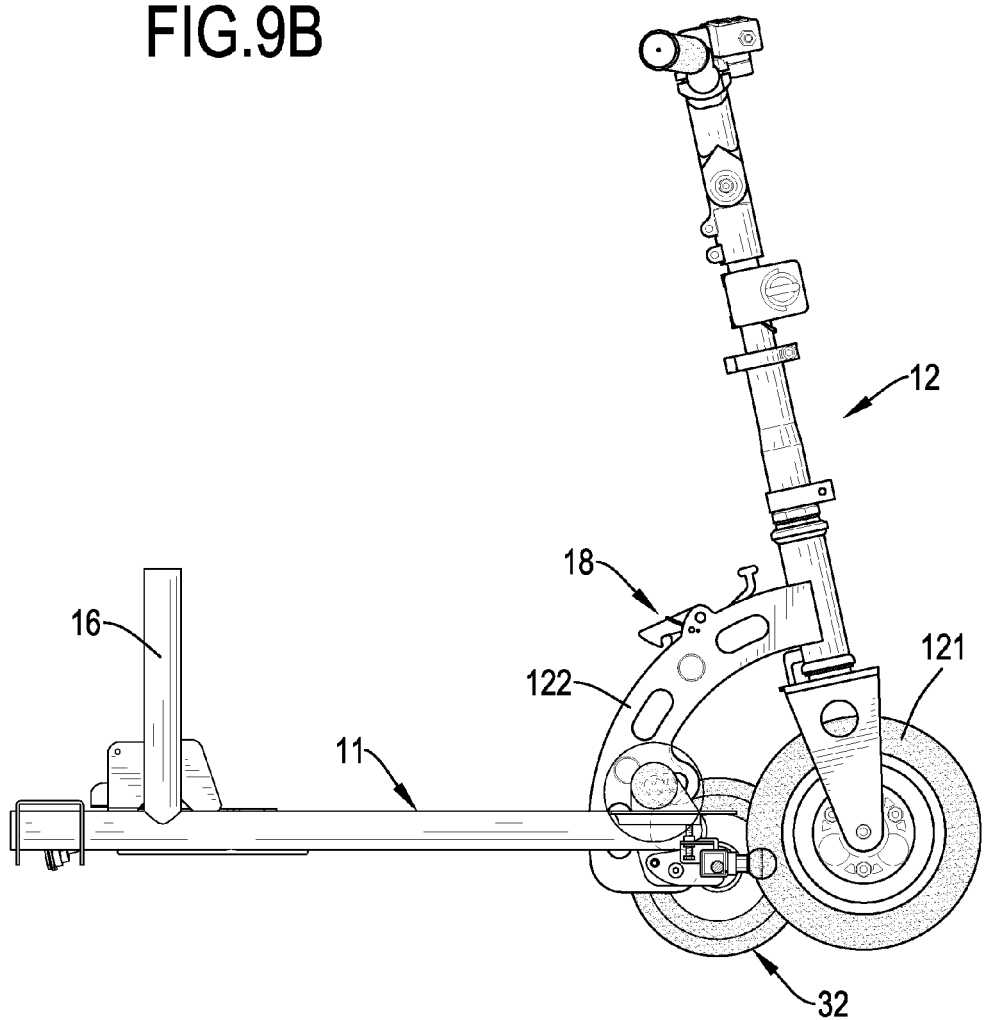
FIG. 9A is a side view of the front frame of the frame apparatus in FIG. 1.
Figure 10:
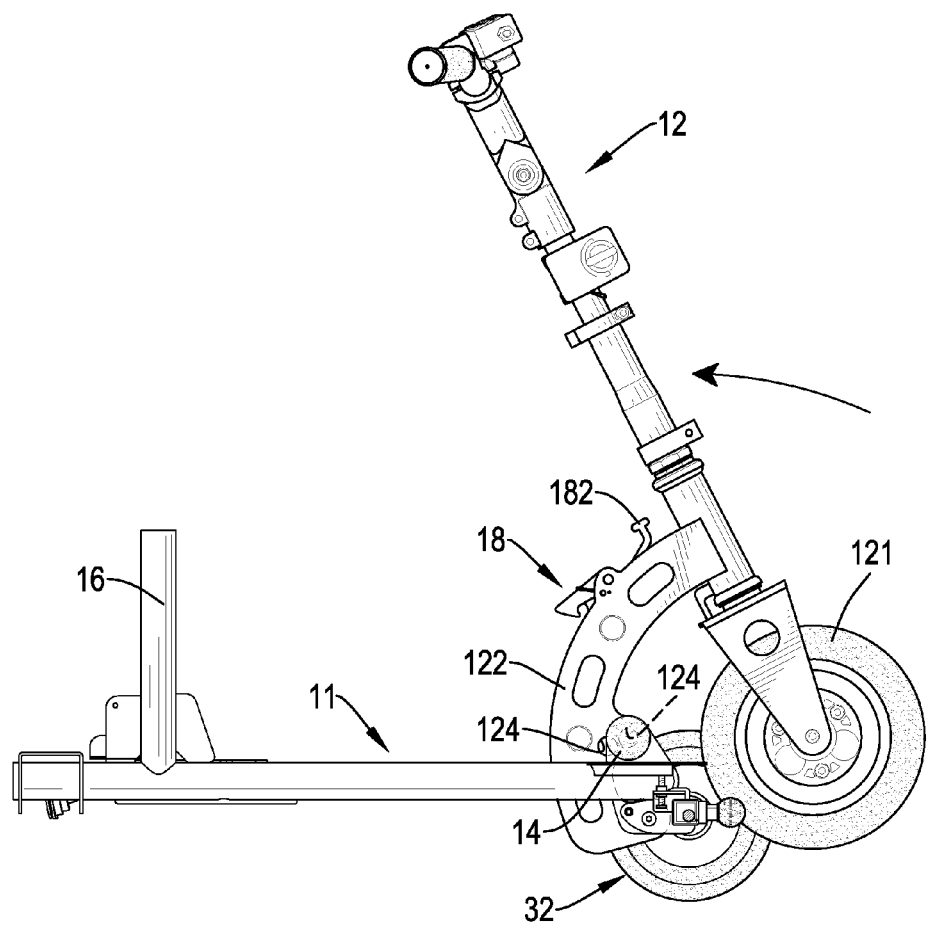
FIG. 10 is an operational side view of the front frame of the frame apparatus in FIG. 9A.

Preferably, the locking board 123 of one of the connecting arms 122 has only one locking hole 124, and the locking board 123 of the other connecting arm 122 has two locking holes 124. Furthermore, with reference to FIGS. 9A and 9B, the three locking holes 124 of the locking boards 123 are misaligned with one another, and this can enable the locking elements 124 to lock with the locking boards 123 in the different locking holes 124. Then, the angle between the base 11 and the handle frame 12 can be adjusted to meet the needs of the users as shown in FIGS. 9A, 9B and 10.

Figure 12:
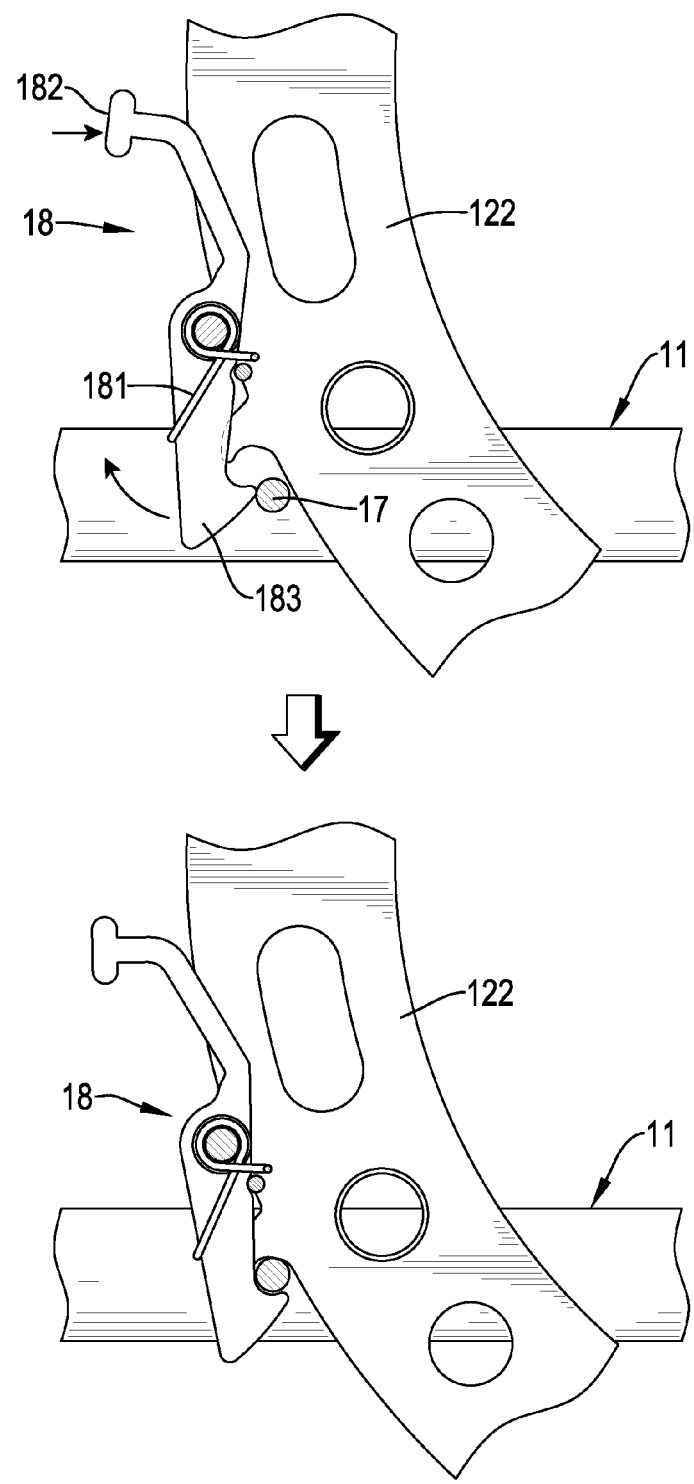
FIG. 12 is an enlarged operational side view of a positioning slab of the front frame of the frame apparatus in FIG. 1.

Additionally, with reference to FIGS. 11A, 11B and 12, the handle frame 12 further has a positioning slab 18 rotatably connected to an inner surface of one of the connecting arms 122 to connect with the positioning shaft 17. The positioning slab 18 has two ends, a torsion spring 181, a pressing tab 182 and a holding hook 183. The torsion spring 181 is connected to the positioning slab 18 and the corresponding connecting arm 122 to provide an elastic force to the positioning slab 18 at a specific direction. The pressing tab 182 is formed on and protrudes from one of the ends of the positioning slab 18. The holding hook 183 is formed on and protrudes from the other end of the positioning slab 18 to selectively engage the positioning shaft 17 when the handle frame 12 is moved toward the base 11.

Figure 2:
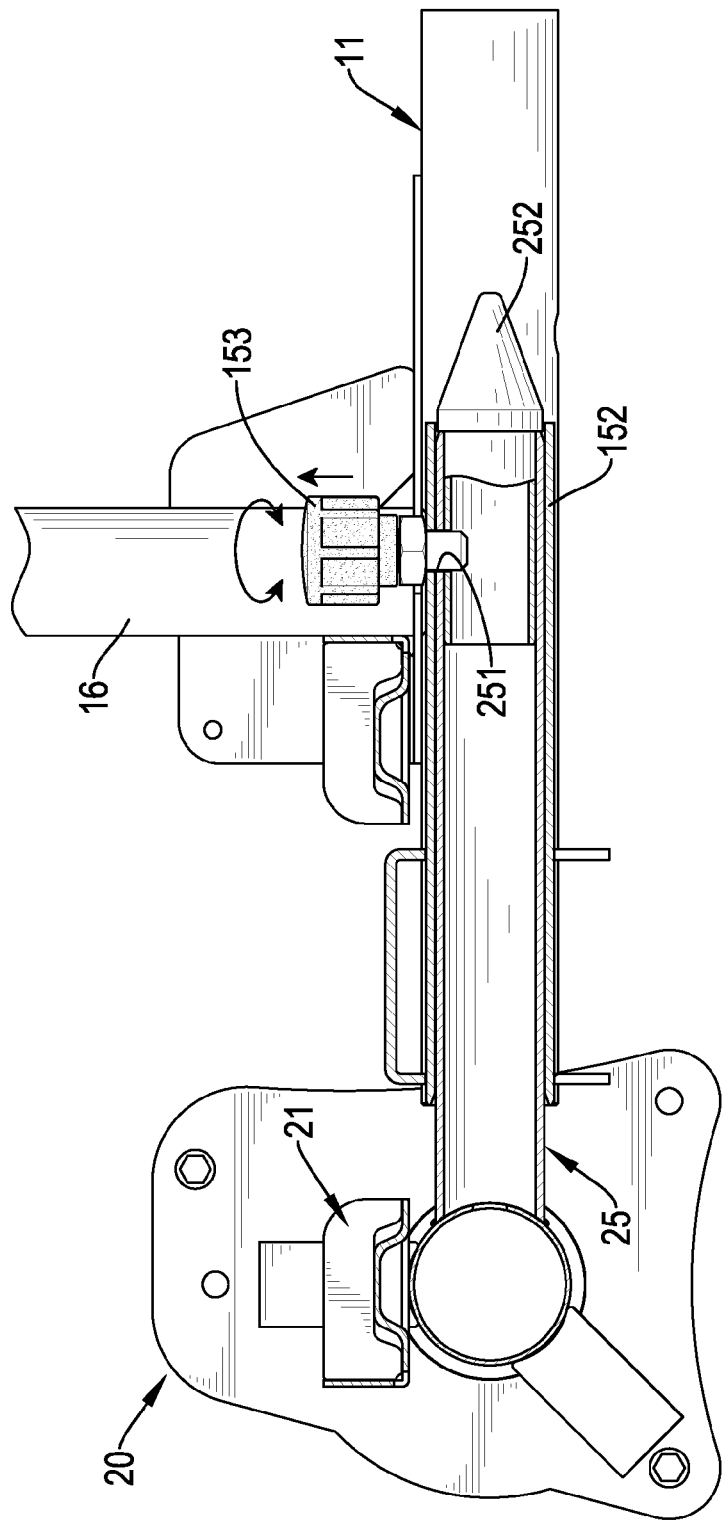
FIG. 2 is an enlarged side view in partial section of the frame apparatus in FIG. 1.
Figure 3:
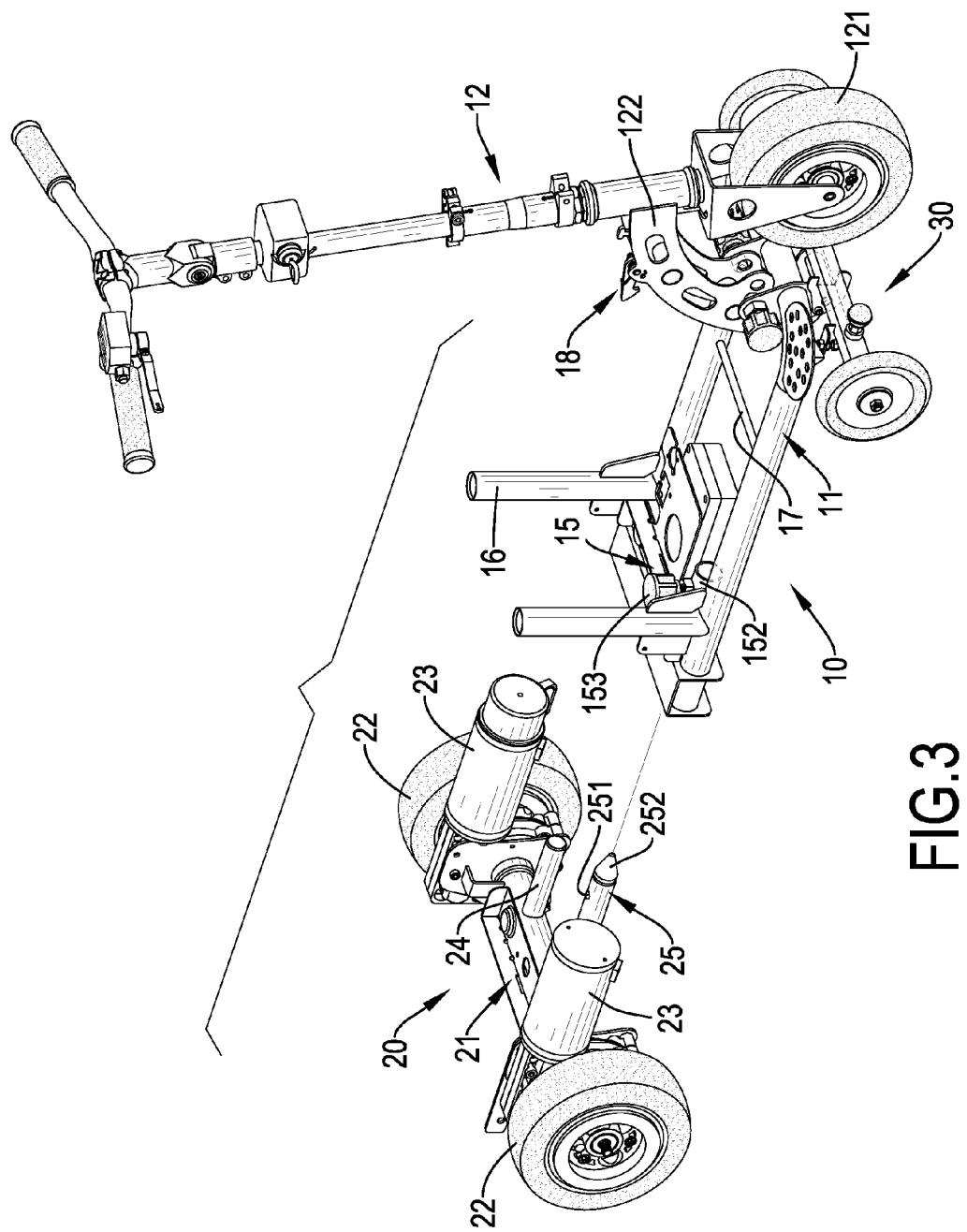
FIG. 3 is an exploded perspective view of the frame apparatus in FIG. 1.

With referenced to FIGS. 1 to 3, the rear frame 20 is detachably connected to the front frame 10 and has a bottom mount 21, two rear wheels 22 and at least one driving motor 23. The bottom mount 21 is detachably connected to the mounting frame 15 of the front frame 10 and has a front side, two sidewalls, a guiding rod 24 and an engaging shaft 25. The guiding rod 24 is formed on and protrudes from the front side of the bottom mount 21 and extends through one of the mounting holes 151 of the mounting frame 15 when the bottom mount 21 is connected to the mounting frame 15.

The engaging shaft 25 is formed on and protrudes from the front side of the bottom mount 21, extends through the other mounting hole 151 of the mounting frame 15 and further extends through the mounting tube 152 of the mounting frame 15. The engaging shaft 25 has a front end, an external surface, an engaging hole 251 and a conical surface 252. The free end of the engaging shaft 25 extends out of the mounting tube 152 of the mounting frame 15. The engaging hole 251 is formed through the external surface of the engaging shaft 25 and engages the holding element 153 when the bottom mount 21 is connected to the mounting frame 15 of the base 11. The conical surface 252 is formed around the external surface of the engaging shaft 25 at the front end of the engaging shaft 25 and selectively abuts the holding element 153 of the mounting frame 15. When the engaging shaft 25 moves into the mounting tube 152, the conical surface 252 abuts the holding element 153 and this can provide a guiding effect for the holding element 153 to move upwardly relative to the mounting tube 152.

The rear wheels 22 are rotatably and respectively connected to the sidewalls of the bottom mount 21. The at least one driving motor 23 is securely mounted on the bottom mount 21, is connected to the rear wheels 22 to drive the rear wheels 22 to rotate relative to the bottom mount 21.

Figure 4B:
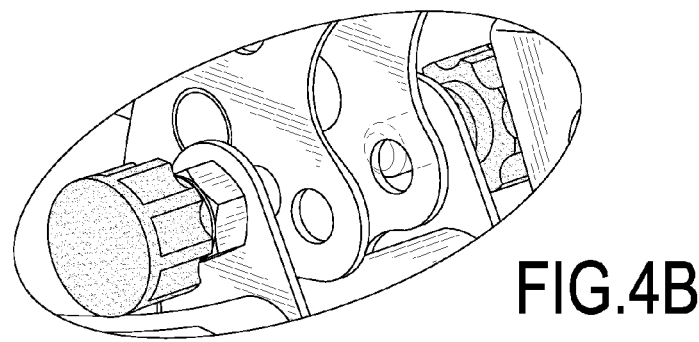
FIG. 4B is an enlarged perspective view of the frame apparatus in FIG. 4A.
Figure 4A:
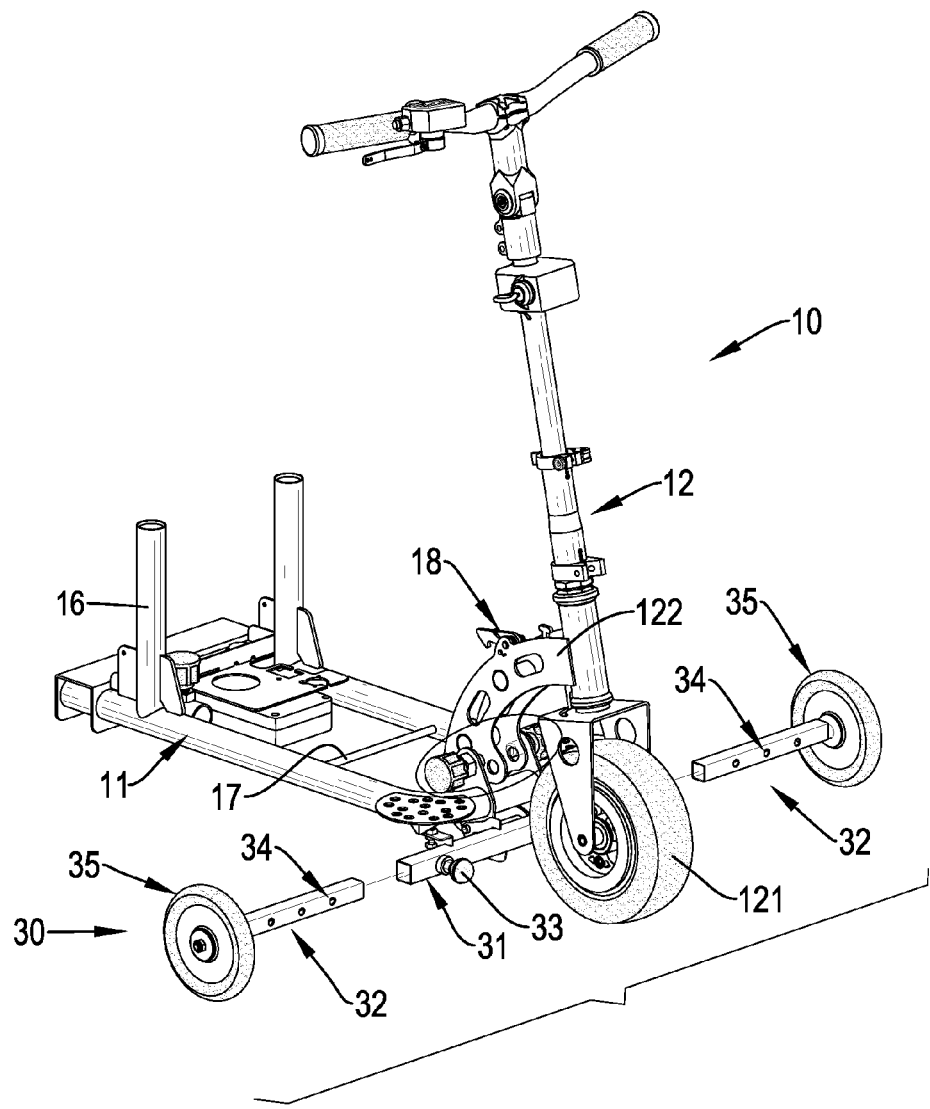
FIG. 4A is another exploded perspective view of the frame apparatus in FIG. 1.
Figure 5:
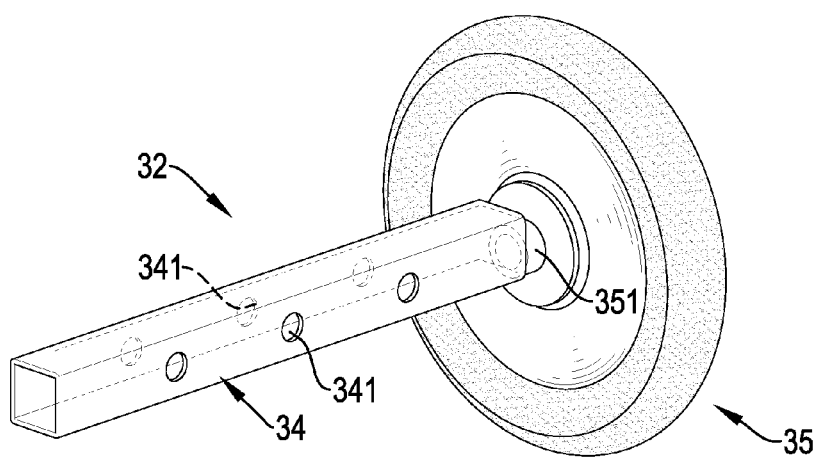
FIG. 5 is an enlarged perspective view of an auxiliary wheel shaft of the frame apparatus in FIG. 1.

With reference to FIGS. 4A, 4B and 5, the auxiliary wheel frame 30 is securely connected to the base 11 of the front frame 10 and has a fixing frame 31 and two auxiliary wheel shafts 32. The fixing frame 31 may be in a square shape, is securely and transversally connected to the middle of the base 11 at a rear side of the front wheel 121 and has a front side, two open ends and two locating elements 33. The locating elements 33 are retractably connected to the front side of the fixing frame 31 beside the front wheel 121.

The auxiliary wheel shafts 32 are detachably connected to the open ends of the fixing frame 31, and each auxiliary wheel shaft 32 has an inserting rod 34 and an auxiliary wheel 35. The inserting rod 34 has a shape corresponding to the square shape of the fixing frame 31 and has an inner end, an outer end, a front side, a rear side and multiple inserting holes 341. The inner end of the inserting rod 34 is inserted into the fixing frame 31 via one of the open ends of the fixing frame 31. The inserting holes 341 are formed through the front side and the rear side of the inserting rod 34 and selectively engage one of the locating elements 33 to hold the inserting rod 34 securely with the fixing frame 31. The auxiliary wheel 35 is mounted on the outer end of the inserting rod 34 and has an axle 351. The axle 351 of the auxiliary wheel 35 is securely mounted on the outer end of the inserting rod 34 and is eccentric to a center of the outer end of the inserting rod 34.

With reference to FIGS. 1 to 3, when transporting the frame apparatus in accordance with the present invention, the holding element 153 is pulled and rotated relative to the mounting tube 152 to disengage from the engaging hole 251 of the engaging shaft 25. The rear frame 20 is pulled to move backwardly relative to the front frame 10 to enable the guiding rod 24 and the engaging shaft 25 to depart from the mounting holes 151 and the mounting tube 152 of the mounting frame 15. Then, the rear frame 20 can be separated from the front frame 10 and a user can transport the front frame 10 and the rear frame 20 respectively, and this can reduce the burden of carrying and also can reduce the space of storing the whole frame apparatus.

Figure 6:
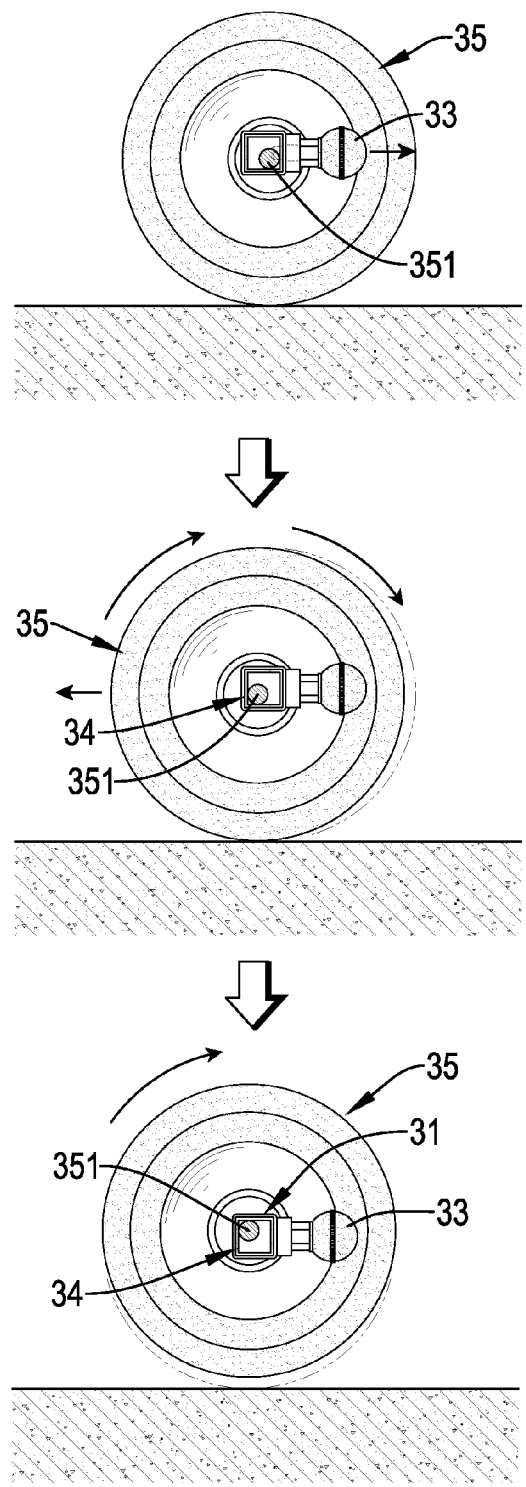
FIG. 6 shows operational side views of the auxiliary wheel shaft of the frame apparatus in FIG. 1.

Additionally, with further reference to FIGS. 4A, 4B and 5, the user can pull and rotate the locating elements 33 relative to the fixing frame 31. Then, the locating elements 33 are disengaged from the corresponding inserting holes 341 of the inserting rods 34 to enable the auxiliary wheel shafts 32 to separate from the fixing frame 31. With reference to FIG. 6, the axles 351 of the auxiliary wheels 35 are eccentrically mounted on the outer ends of the inserting rods 34. Accordingly, the heights of the auxiliary wheels 35 relative to the ground can be adjusted by rotating the auxiliary wheel shafts 32 by 180 degrees.

Figure 7B:
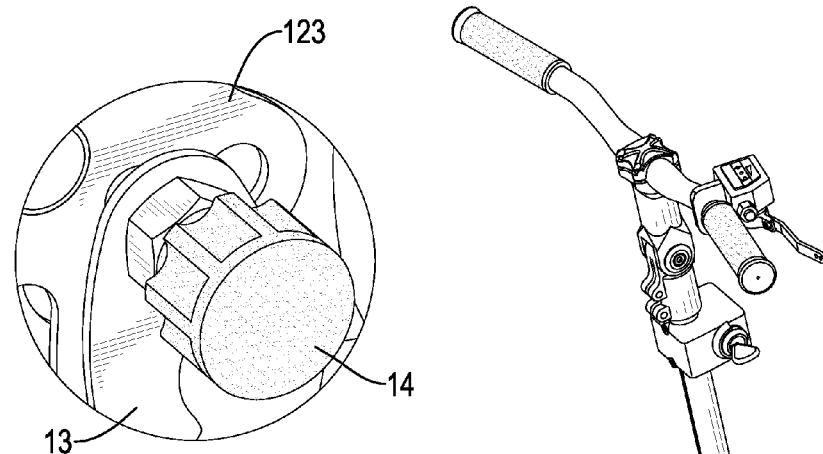
FIG. 7B is an enlarged perspective view of the front frame of the frame apparatus in FIG. 7A.
Figure 7A:
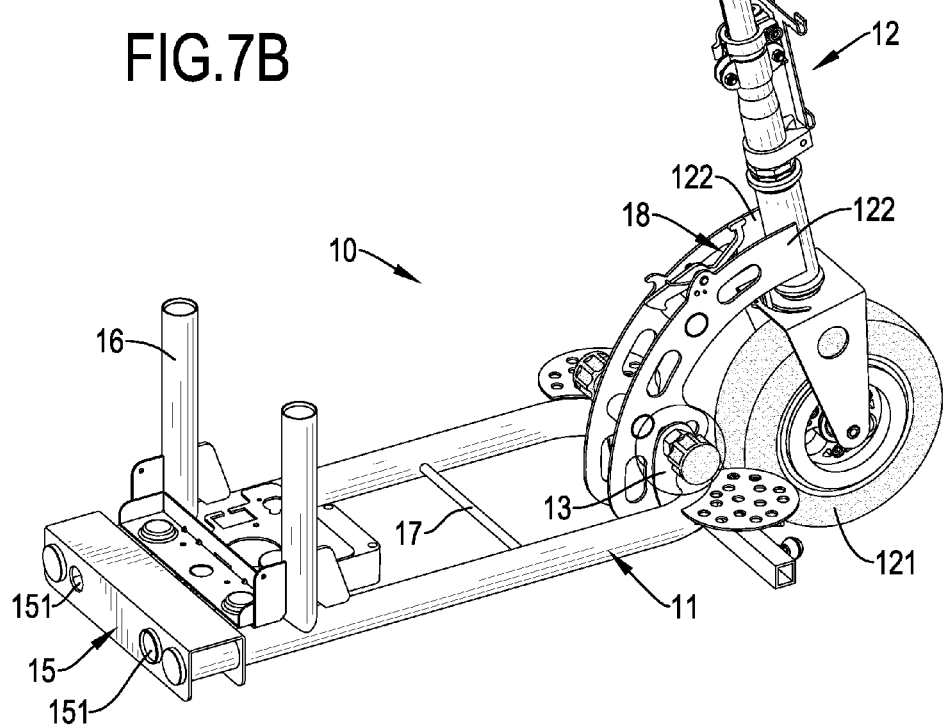
FIG. 7A is a perspective view of a front frame of the frame apparatus in FIG. 1.
Figure 8:
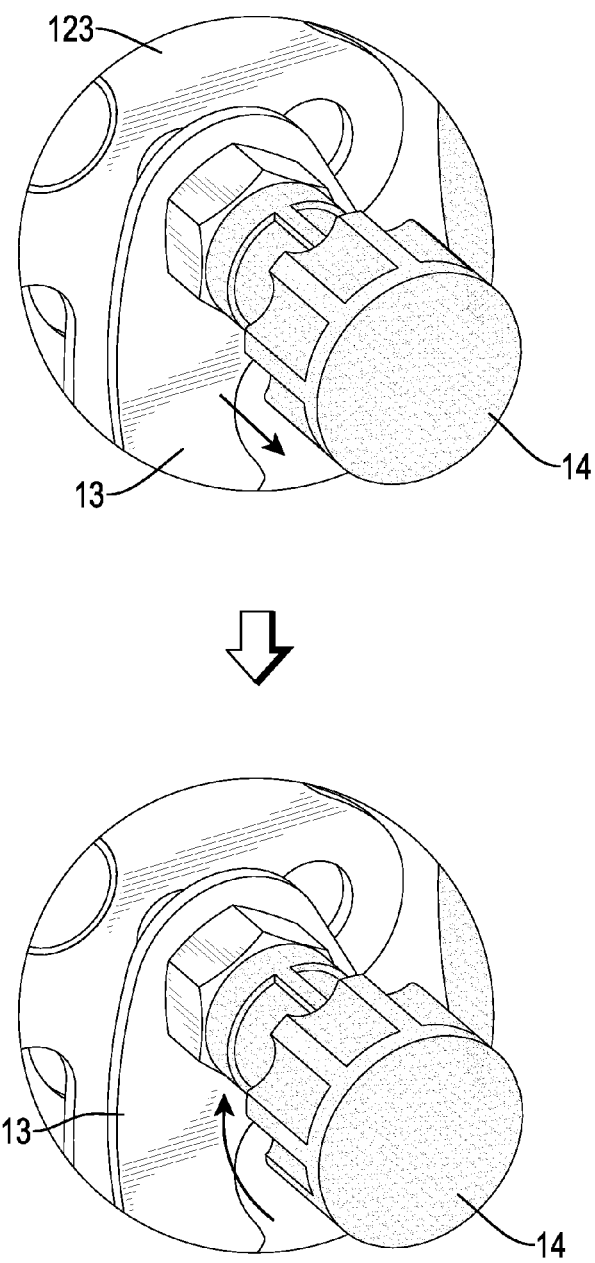
FIG. 8 is an operational perspective view of a locking element of the front frame of the frame apparatus in FIG. 1.

With reference to FIGS. 7A, 7B and 8, when the rear frame 20 is separated from the front frame 10, the user can pull and rotate the locking elements 14 relative to the connecting tabs 13 to separate from the corresponding locking holes 124 of the locking boards 123. Then, the connecting arms 122 can be rotated relative to the middle of the base 11, and the handle frame 12 can be moved toward the base 11. With reference to FIGS. 11A, 11B and 12, when the handle frame 12 is moved to abut the base 11, the positioning slab 18 can be rotated relative to the connecting arms 122 by pressing the pressing tab 182 to enable the holding hook 183 to move relative to the positioning shaft 17. When the pressing tab 182 is pressed, the positioning slab 18 will rotate to the original position by the elastic force of the torsion spring 181 to enable the holding hook 183 to engage the positioning shaft 17. Consequently, when the handle frame 12 is folded with the base 11, the engagement between the positioning shaft 17 and the holding hook 183 of the positioning slab 18 can prevent the handle frame 12 from rotating relative to the base 11 during the transporting process.

Furthermore, with reference to FIGS. 9A, 9B and 10, the frame apparatus for a lightweight rollator in accordance with the present invention can be adjusted according to the user's height or arm length to change the angle between the handle frame 12 and the base 11 by locking the locking elements 14 in the different locking holes 124 of the locking boards 123.

According to the above-mentioned features, the frame apparatus for a lightweight rollator in accordance with the present invention can reduce the volume of the whole frame apparatus by the U-shaped base 11 of the front frame 10 and this can enable the lightweight rollator to move freely in a narrow space. Then, the elderly or the patients can move directly from the bed to the lightweight rollator indoors and this is convenient in use. In addition, the rear frame 20 can be separated from the front frame 10 easily by disengaging the holding element 153 from the engaging shaft 25. Then, the front frame 10 and the rear frame 20 can be transported respectively and this is labor-saving in transportation and can reduce the space of storing the lightweight rollator. Furthermore, the handle frame 12 can be folded and held with the base 11 and this also can reduce the volume of the lightweight rollator and is conveniently in use, storage, and transportation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A frame apparatus for a lightweight rollator having:
  a front frame having:
    a base having:
      two free rear ends;
      a middle;
      two connecting tabs formed on and protruding upwardly from the middle of the base at an interval and being parallel to each other;
      two locking elements retractably and respectively mounted on the connecting tabs;
      a mounting frame mounted on the free rear ends of the front frame and having two mounting holes formed through the mounting frame between the free rear ends of the base; and
    a handle frame rotatably connected to the base and having:
      a lower end;
      a front wheel rotatably connected to the lower end of the handle frame; and
      two connecting arms being curved, formed on and protruding backwardly from the handle frame near the lower end of the handle frame and pivotally connected to the middle of the base between the connecting tabs, and each connecting arm having a locking board formed on and protruding forwardly from the connecting arm to lock with one of the locking elements; and
  a rear frame detachably connected to the front frame and having:
    a bottom mount detachably connected to the mounting frame of the front frame and having
      a front side;
      two sidewalls;
      a guiding rod formed on and protruding from the front side of the bottom mount and extending through one of the mounting holes of the mounting frame when the bottom mount is connected to the mounting frame; and
      an engaging shaft formed on and protruding from the front side of the bottom mount and extending through the other mounting hole of the mounting frame;
    two rear wheels rotatably and respectively connected to the sidewalls of the bottom mount; and
    at least one driving motor securely mounted on the bottom mount and connected to the rear wheels to drive the rear wheels to rotate relative to the bottom mount.

2. The frame apparatus as claimed in claim 1, wherein the frame apparatus has an auxiliary wheel frame securely connected to the base of the front frame and having
  a fixing frame securely and transversally connected to the middle of the base at a rear side of the front wheel and having
    a front side;
    two open ends; and
    two locating elements retractably connected to the front side of the fixing frame beside the front wheel; and
  two auxiliary wheel shafts detachably connected to the open ends of the fixing frame, and each auxiliary wheel shaft having
    an inserting rod having
      an inner end inserted into the fixing frame via one of the open ends of the fixing frame;
      an outer end;
      a front side;
      a rear side; and
      multiple inserting holes formed through the front side and the rear side of the inserting rod and selectively engaging one of the locating elements to hold the inserting rod securely with the fixing frame; and
    an auxiliary wheel mounted on the outer end of the inserting rod and having an axle securely mounted on the outer end of the inserting rod.

3. The frame apparatus as claimed in claim 2, wherein the axle of the auxiliary wheel is eccentric to a center of the outer end of the inserting rod.

4. The frame apparatus as claimed in claim 3, wherein
  the mounting frame has
    a mounting tube mounted in one of the mounting holes and having a front end extending forwardly; and
    a holding element retractably mounted on the mounting tube near the front end of the mounting tube;
  the engaging shaft extends through the mounting tube of the mounting frame and has
    a front end extending out of the mounting tube of the mounting frame;
    an external surface;
    an engaging hole formed through the external surface of the engaging shaft and engaging the holding element when the bottom mount is connected to the mounting frame of the base; and
    a conical surface formed around the external surface of the engaging shaft at the front end of the engaging shaft and selectively abutting the holding element of the mounting frame.

5. The frame apparatus as claimed in claim 4, wherein
the base has a positioning shaft transversally connected to the base between the middle and the free rear ends of the base; and
the handle frame has a positioning slab rotatably connected to an inner surface of one of the connecting arms to connect with the positioning shaft, and the positioning slab has
two ends;
a torsion spring connected to the positioning slab and the corresponding connecting arm;
a pressing tab formed on and protruding from one of the ends of the positioning slab; and
a holding hook formed on and protruding from the other end of the positioning slab to selectively engage the positioning shaft when the handle frame is moved to the base.

6. The frame apparatus as claimed in claim 5, wherein the base has two seat tubes respectively formed on and protruding upwardly from the free rear ends of the base and being parallel to each other.

7. The frame apparatus as claimed in claim 5, wherein the locking board of one of the connecting arms has one locking hole, and the locking board of the other connecting arm has two locking holes, the three locking holes of the locking boards are misaligned with one another.

8. The frame apparatus as claimed in claim 3, wherein
the base has a positioning shaft transversally connected to the base between the middle and the free rear ends of the base; and
the handle frame has a positioning slab rotatably connected to an inner surface of one of the connecting arms to connect with the positioning shaft, and the positioning slab has
two ends;
a torsion spring connected to the positioning slab and the corresponding connecting arm;
a pressing tab formed on and protruding from one of the ends of the positioning slab; and
a holding hook formed on and protruding from the other end of the positioning slab to selectively engage the positioning shaft when the handle frame is moved to the base.

9. The frame apparatus as claimed in claim 1, wherein
the mounting frame has
a mounting tube mounted in one of the mounting holes and having a front end extending forwardly; and
a holding element retractably mounted on the mounting tube near the front end of the mounting tube;
the engaging shaft extends through the mounting tube of the mounting frame and has
a front end extending out of the mounting tube of the mounting frame;
an external surface;
an engaging hole formed through the external surface of the engaging shaft and engaging the holding element when the bottom mount is connected to the mounting frame of the base; and
a conical surface formed around the external surface of the engaging shaft at the front end of the engaging shaft and selectively abutting the holding element of the mounting frame.

10. The frame apparatus as claimed in claim 9, wherein
the base has a positioning shaft transversally connected to the base between the middle and the free rear ends of the base; and
the handle frame has a positioning slab rotatably connected to an inner surface of one of the connecting arms to connect with the positioning shaft, and the positioning slab has
two ends;
a torsion spring connected to the positioning slab and the corresponding connecting arm;
a pressing tab formed on and protruding from one of the ends of the positioning slab; and
a holding hook formed on and protruding from the other end of the positioning slab to selectively engage the positioning shaft when the handle frame is moved to the base.

11. The frame apparatus as claimed in claim 10, wherein the base has two seat tubes respectively formed on and protruding upwardly from the free rear ends of the base and being parallel to each other.

12. The frame apparatus as claimed in claim 10, wherein the locking board of one of the connecting arms has one locking hole, and the locking board of the other connecting arm has two locking holes, the three locking holes of the locking boards are misaligned with one another.

13. The frame apparatus as claimed in claim 2, wherein
the mounting frame has
a mounting tube mounted in one of the mounting holes and having a front end extending forwardly; and
a holding element retractably mounted on the mounting tube near the front end of the mounting tube;
the engaging shaft extends through the mounting tube of the mounting frame and has
a front end extending out of the mounting tube of the mounting frame;
an external surface;
an engaging hole formed through the external surface of the engaging shaft and engaging the holding element when the bottom mount is connected to the mounting frame of the base; and
a conical surface formed around the external surface of the engaging shaft at the front end of the engaging shaft and selectively abutting the holding element of the mounting frame.

14. The frame apparatus as claimed in claim 13, wherein
the base has a positioning shaft transversally connected to the base between the middle and the free rear ends of the base; and
the handle frame has a positioning slab rotatably connected to an inner surface of one of the connecting arms to connect with the positioning shaft, and the positioning slab has
two ends;
a torsion spring connected to the positioning slab and the corresponding connecting arm;
a pressing tab formed on and protruding from one of the ends of the positioning slab; and
a holding hook formed on and protruding from the other end of the positioning slab to selectively engage the positioning shaft when the handle frame is moved to the base.

15. The frame apparatus as claimed in claim 14, wherein the base has two seat tubes respectively formed on and protruding upwardly from the free rear ends of the base and being parallel to each other.

16. The frame apparatus as claimed in claim 14, wherein the locking board of one of the connecting arms has one locking hole, and the locking board of the other connecting arm has two locking holes, the three locking holes of the locking boards are misaligned with one another.

17. The frame apparatus as claimed in claim 2, wherein
the base has a positioning shaft transversally connected to the base between the middle and the free rear ends of the base; and
the handle frame has a positioning slab rotatably connected to an inner surface of one of the connecting arms to connect with the positioning shaft, and the positioning slab has
two ends;
a torsion spring connected to the positioning slab and the corresponding connecting arm;
a pressing tab formed on and protruding from one of the ends of the positioning slab; and
a holding hook formed on and protruding from the other end of the positioning slab to selectively engage the positioning shaft when the handle frame is moved to the base.

18. The frame apparatus as claimed in claim 2, wherein the base has two seat tubes respectively formed on and protruding upwardly from the free rear ends of the base and being parallel to each other.

19. The frame apparatus as claimed in claim 1, wherein
the base has a positioning shaft transversally connected to the base between the middle and the free rear ends of the base; and
the handle frame has a positioning slab rotatably connected to an inner surface of one of the connecting arms to connect with the positioning shaft, and the positioning slab has
two ends;
a torsion spring connected to the positioning slab and the corresponding connecting arm;
a pressing tab formed on and protruding from one of the ends of the positioning slab; and
a holding hook formed on and protruding from the other end of the positioning slab to selectively engage the positioning shaft when the handle frame is moved to the base.

20. The frame apparatus as claimed in claim 1, wherein the base has two seat tubes respectively formed on and protruding upwardly from the free rear ends of the base and being parallel to each other.

* * * * *